(No Model.) 5 Sheets—Sheet 1.

C. H. TRASK.
BOOT OR SHOE TRIMMING MACHINE.

No. 383,331. Patented May 22, 1888.

Witnesses.
Inventor.

(No Model.) 5 Sheets—Sheet 2.
C. H. TRASK.
BOOT OR SHOE TRIMMING MACHINE.
No. 383,331. Patented May 22, 1888.
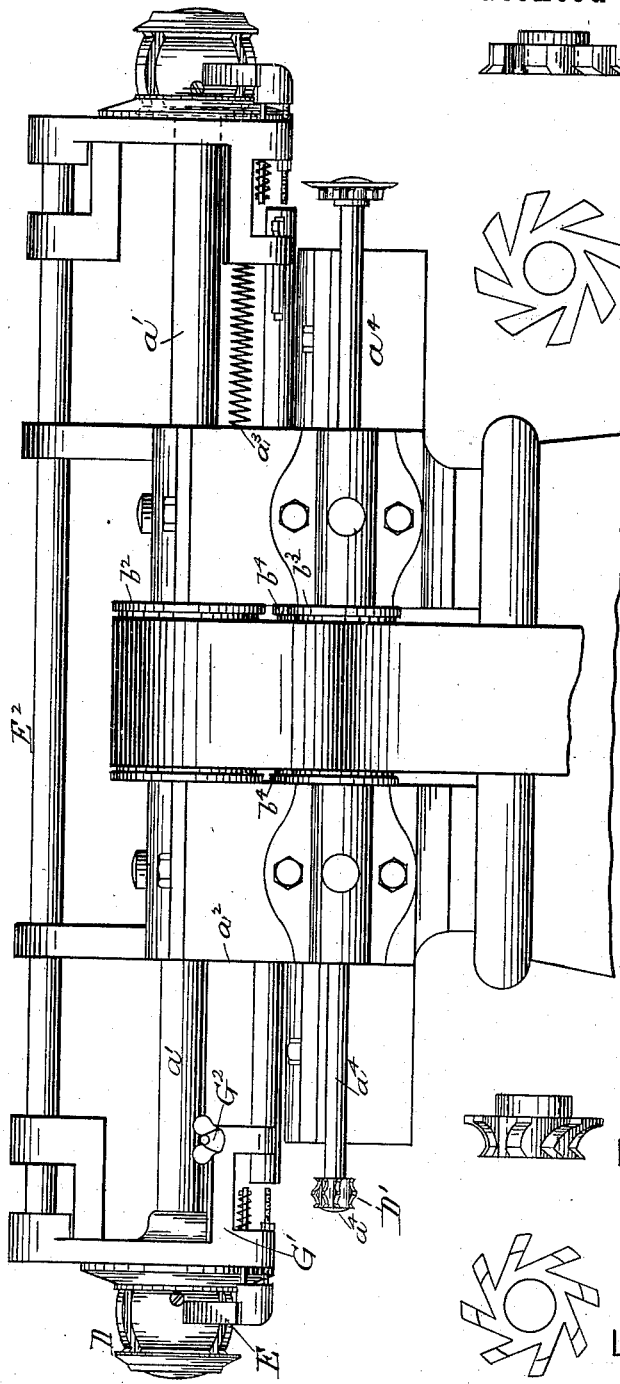
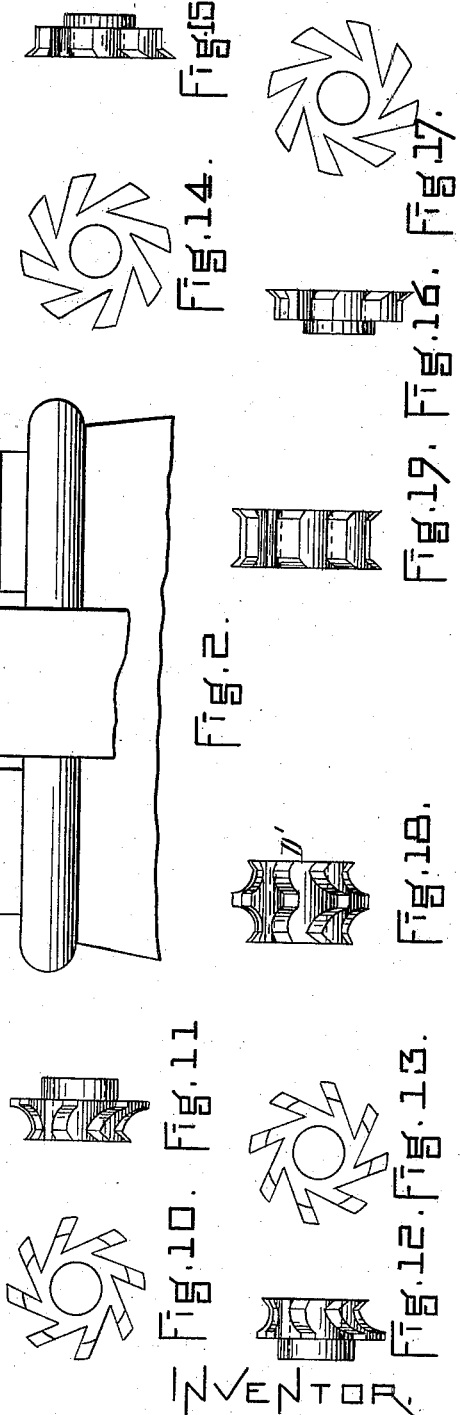
Witnesses.
Inventor.

(No Model.)  5 Sheets—Sheet 3.

C. H. TRASK.
BOOT OR SHOE TRIMMING MACHINE.

No. 383,331. Patented May 22, 1888.

WITNESSES.  INVENTOR.

(No Model.)  5 Sheets—Sheet 4.

C. H. TRASK.
BOOT OR SHOE TRIMMING MACHINE.

No. 383,331.  Patented May 22, 1888.

WITNESSES.  INVENTOR.

(No Model.) 5 Sheets—Sheet 5.
C. H. TRASK.
BOOT OR SHOE TRIMMING MACHINE.

No. 383,331. Patented May 22, 1888.

WITNESSES.
J. M. Dolan,
E. H. Chalin,

INVENTOR.
Chas. H. Trask,
by his attys
Clark & Raymond.

N. PETERS, Photo-Lithographer, Washington, D. C.

UNITED STATES PATENT OFFICE.

CHARLES H. TRASK, OF LYNN, MASSACHUSETTS, ASSIGNOR TO THE DUPLEX SHOE TRIMMER COMPANY, OF PORTLAND, MAINE.

BOOT OR SHOE TRIMMING MACHINE.

SPECIFICATION forming part of Letters Patent No. 383,331, dated May 22, 1888.

Application filed June 8, 1887. Serial No. 240,600. (No model.)

*To all whom it may concern:*

Be it known that I, CHARLES H. TRASK, of Lynn, in the county of Essex and State of Massachusetts, a citizen of the United States, have invented a new and useful Improvement in Boot or Shoe Sole and Heel Edge Trimming Machines, of which the following is a full, clear, and exact description, reference being had to the accompanying drawings, forming a part of this specification, in explaining its nature.

The invention relates to a sole and heel edge trimming machine adapted to use either single or double trimmers, and it comprises the arrangement and organization in a machine of a common support or head, one or more shafts for supporting the trimmers at one or both ends adapted to be rotated in one direction, and one or more shafts supported by the same head, carrying trimmers at one or both ends, adapted to be turned in a direction opposite to that of the shaft or shafts first named.

It further relates to various details of organization and construction, all of which will be hereinafter described.

Figure 1:
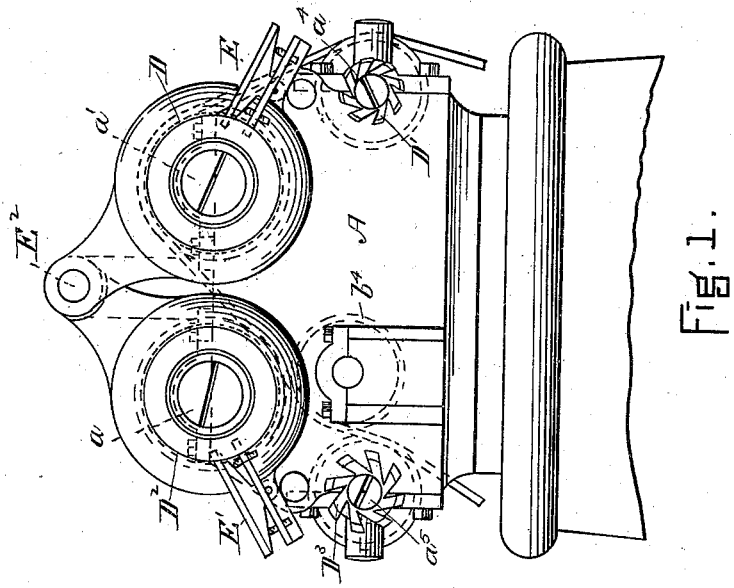
Figure 3:
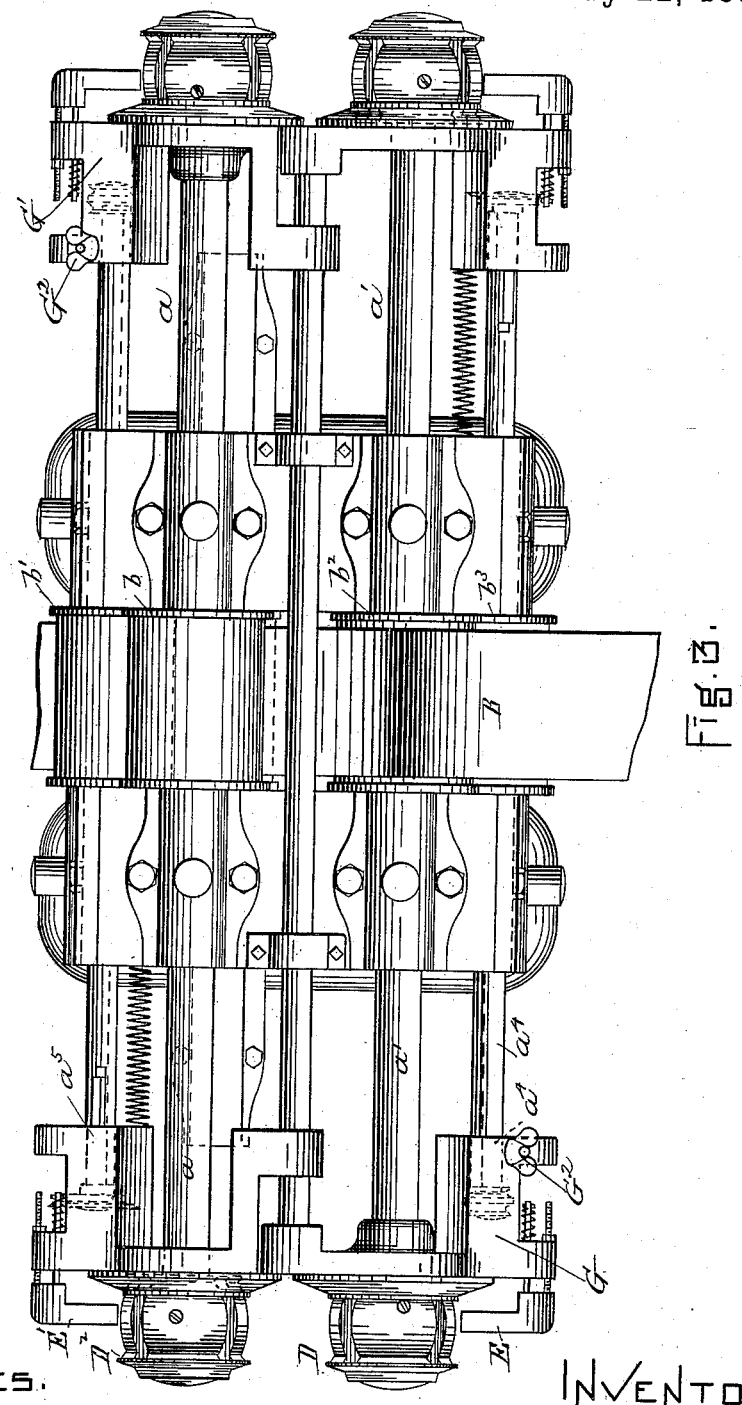
Figure 4:
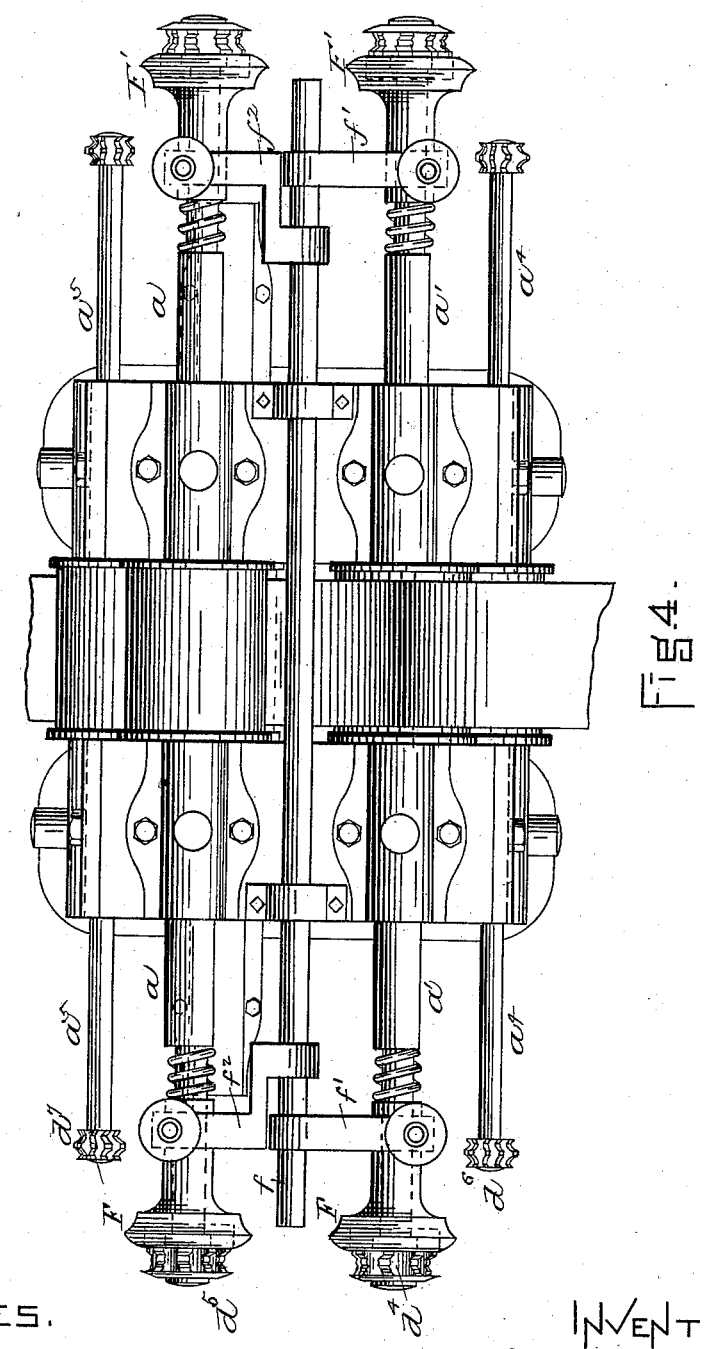
Figure 5:
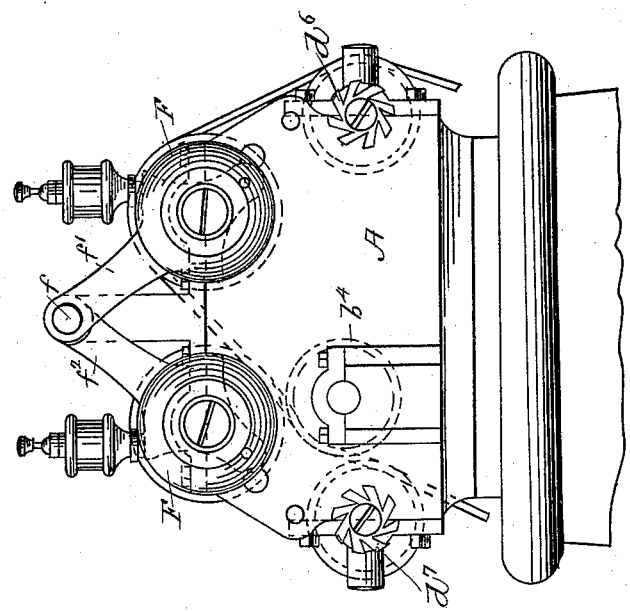
Figure 21:
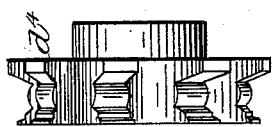
Figure 23:
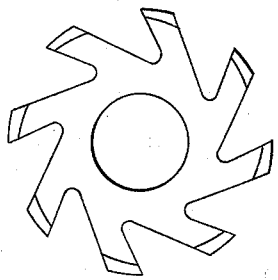
Figure 20:
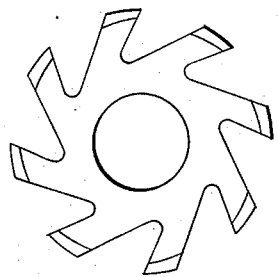
Figure 22:
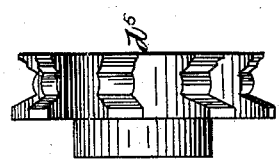
Figure 24:
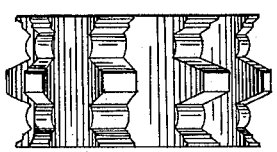

In the drawings, Figure 1 represents a front elevation of the upper part of a multiplex machine containing the features of my invention. Fig. 2 is an end elevation thereof. Fig. 3 is a plan view thereof. Fig. 4 is also a plan view illustrating the invention as applied to sole-edge trimming. Fig. 5 is a front elevation of the machine organized as a sole-edge trimmer. Figs. 6, 7, 8, and 9 are views of heel-cutters. Figs. 10, 11, 12, and 13 are views of right and left shank-trimmers. Figs. 14, 15, 16, and 17 are views of right and left heel-rand trimmers. Figs. 18 and 19 are views of duplex shank-trimmers. Figs. 20, 21, 22, and 23 are views of right and left hand sole-edge trimmers. Fig. 24 is a view of a duplex sole edge trimmer.

A is the head of the machine.

$a\ a'$ are shafts carried thereby and arranged upon substantially the same plane, and to extend from each of the fronts $a^2\ a^3$ of the head the same distance.

$a^4\ a^5$ are other shafts carried by the head and arranged upon a line below the shafts $a\ a'$, one on one side of a perpendicular line drawn through the shaft $a'$ and the other on one side of a perpendicular line drawn through the shaft $a$. The shafts $a^4\ a^5$ do not extend from the fronts $a^2\ a^3$ to so great a distance as the shafts $a\ a'$.

The shaft $a$ has the pulley $b$, the shaft $a^5$ the pulley $b'$, the shaft $a'$ has the pulley $b^2$, and the shaft $a^4$ the pulley $b^3$. The shafts $a'\ a^4$ are turned in the same direction by the belt B, which passes over the pulleys $b^2\ b^3$ and under the pulleys $b\ b'$. The course of the belt and the relation which it bears to the various pulleys are well shown in Fig. 1, and a guiding pulley or idler, $b^4$, (shown in said figure,) may be used for throwing or causing the belt to bear against the pulleys $b\ b'$. This construction provides the machines with a duplex organization upon each front of the machine—that is, there are arranged to project from each front four shafts, which are simultaneously rotated, two of which are to turn in one direction and the other two in the reverse direction, and which are adapted, the first to carry right trimmers and the second to carry left trimmers.

In the view represented in Fig. 1 the trimmers $D\ D'$ are right trimmers and the trimmers $D^2\ D^3$ are left trimmers.

In Figs. 1, 2, and 3 I have shown the shafts $a\ a'$ as supporting heel-trimmers and the shafts $a^4\ a^5$ as supporting shank-edge trimmers.

In Figs. 4 and 5 the shafts $a\ a'$ are represented as supporting sole-edge trimmers $d^4\ d^5$ and the shafts $a^4\ a^5$ as supporting shank-edge trimmers $d^6\ d^7$. The trimmers upon the opposite ends of the shafts $a\ a^4\ a'\ a^5$ from these indicated are respectively left trimmers and right trimmers—that is, the trimmers upon one end of the shafts $a'\ a^4$ are right trimmers and the trimmers upon the opposite ends are left trimmers—and the same is true of the shafts $a^4\ a^5$, except that the left trimmers are upon the same side as the right trimmers $a'\ a^4$.

Either single or duplex trimmers may be used. Where a single trimmer is used, it is adapted, if it is a right trimmer, to be used upon the end of the shaft $a'$, (represented in Fig. 1,) or the opposite end of the shaft $a$. If it is a reversible single cutter similar to that described in my application executed of even date, then it is adapted to be used at will upon either end of the two shafts. If it is a duplex trimmer having double cutting-knives, then it is adapted to be used at will upon either end of the shafts.

Figure 6:
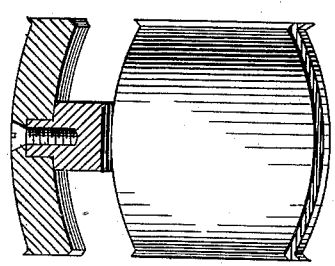
Figure 7:
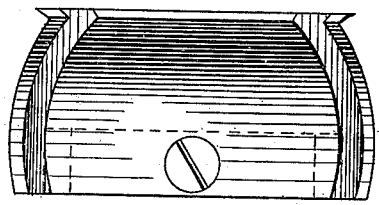
Figure 8:
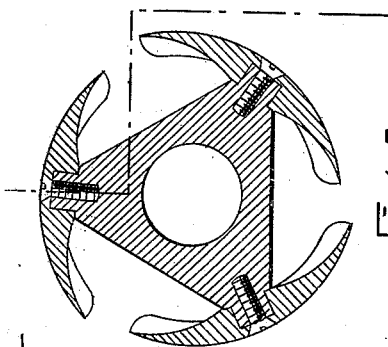
Figure 9:
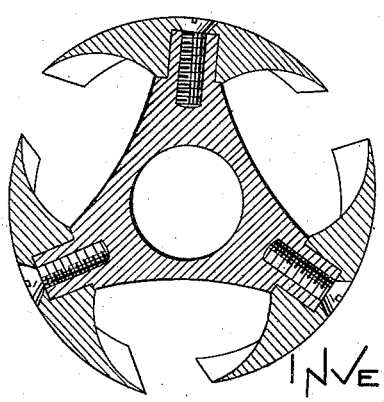

In the drawings, Fig. 7 represents a single trimmer having reversible blades, and Figs. 6, 8, and 9 a duplex trimmer for heel-trimming. Figs. 10, 11, 12, and 13 show different right and left shank-edge trimmers. Figs. 14, 15, 16, and 17 are views of right and left heel-rand trimmers. Figs. 18 and 19 show double or duplex shank-edge trimmers. Figs. 20, 21, 22, and 23 are views of right and left sole-edge trimmers, and Fig. 24 is a view of a duplex sole-edge trimmer.

The shafts $a$ $a'$ support heel-trimmers, the rand-guide, rand-cutter, top-lift guide and gage, and heel-rest, and these parts are substantially like the same parts described in my Patent No. 357,738, and they are operated in connection with the trimmers, as therein specified. They are, however, arranged in opposite or reverse order upon each front of the machine—that is, in Fig. 1 the heel-rest E is arranged as a right heel-rest, while the heel-rest E' is arranged as a left heel-rest—and the same is true of the top-lift guard and rest—that is, the top-lift guard and rest of the right trimmer D is arranged for right presentation of the work and the top-lift guard and rest of the trimmer $D^2$ for left presentation of the work. These top-lift guards and guides are mounted upon a common supporting-rod, $E^2$. (See Fig. 1.) Each of the supports G G' for the top-lift rest and heel-rest of the right and left trimmers, respectively, instead of being moved by a cam, as described in my said patent, is adjusted by a screw, $G^2$, the supports being movable laterally in relation to each other and the trimmers upon the rod $E^2$ or a center.

When the shafts $a^4$ $a^5$ carry sole edge trimmers, as represented in Fig. 4, I use the same form of welt guide and cutter and movable sole and finger-rest as specified in said patent, and support them in the same manner, the two rests F F' being stayed from the common rod $f$ by means of their respective arms $f'$ $f^2$. (See Fig. 4.)

In describing the machine I have as a rule referred to the trimmers as arranged upon the front $a^2$ of the machine, and the machine may be organized so as to have only trimmers upon this front. I have represented it, however, as arranged to have trimmers upon the front $a^3$, and all that I have said in relation to the trimmers upon the front $a^2$ applies equally well to the trimmers used upon the front $a^3$ when the machine is so organized. When it is thus arranged, it is obvious that the machine may have four trimmers of a kind upon the same line, two trimmers for right presentation of the work and two trimmers for left presentation of the work. These trimmers may be all of a kind—that is, they may be all heel-trimmers or they may be two heel-trimmers and two sole-edge trimmers, as may be desired. And this is true of the shafts $a^4$ $a^5$; they may carry at each end shank-edge trimmers, or they may carry at the ends projecting from one front of the machine heel-rand trimmers, and from the ends projecting from the other front of the machine sole-edge trimmers, or trimmers for any other use on the sole or heel.

When the machine is organized to have trimmers upon one front only, then one of the shafts $a$ $a'$ may support a heel-trimmer and the other a sole-edge trimmer. The advantages of this organization arise mainly from the fact that by it opportunity is provided for mounting upon a common support or head a number of trimmers, either single or double, so located or placed as to be simultaneously used, and to be operated by the same mechanism, and also from the fact that right and left single trimmers may be used upon the same side of the machine at the same time.

Having thus fully described my invention, I claim and desire to secure by Letters Patent of the United States—

1. The combination of a common head, a shaft, $a'$, supported by said head and rotated in one direction, a shaft, $a$, supported by said head and rotated in a direction opposite that of the shaft $a'$, a right trimmer or cutter mounted upon one end of the shaft turning to the right, and a left trimmer or cutter mounted upon the end of the shaft turning to the left, all as and for the purposes specified.

2. The combination, in a boot or shoe trimming machine, of a head, A, the shafts $a'$ $a^4$, supported by the head, arranged to extend from one or both fronts thereof, and adapted to be simultaneously turned in the same direction, trimmers at one or both ends of said shafts, and the shafts $a$ $a^5$, adapted to extend from one or both fronts of said head, and trimmers carried by said shafts, and means for rotating the said last-named shafts in a direction opposite that in which the shafts $a'$ $a^4$ are rotated, as and for the purposes described.

3. The combination, in a boot or shoe trimming machine, of a common head, a shaft, $a'$, supported by said head and rotated in one direction, a shaft, $a$, also supported by said head and carried in a direction opposite to that of the shaft $a'$, a right trimmer or cutter carried at the end of the right-turning shaft, a left trimmer or cutter carried at the end of the left-turning shaft, devices in connection with the right trimmer for governing the right presentation of the boot or shoe thereto, and devices in connection with the left trimmer for governing the left presentation of the boot or shoe thereto, substantially as described.

4. In a boot or shoe trimming machine, the combination of the head A, the shafts $a\ a'\ a^4\ a^5$, the ends of which extend from the fronts $a^2\ a^3$ of the head, as specified, the pulleys $b^2\ b^3$ upon the shafts $a'\ a^4$, respectively, and the pulleys $b\ b'$ upon the shafts $a\ a^3$, respectively, the common operating belt $b$, adapted to turn the shaft $a'\ a^4$ in one direction and the shafts $a\ a^5$ in an opposite direction, and rotary trimmers carried at the ends of said shafts, as and for the purposes described.

CHARLES H. TRASK.

In presence of—
F. F. RAYMOND, 2d,
J. M. DOLAN.